（12）United States Patent
Lee et al.

(10) Patent No.: US 10,883,412 B2
(45) Date of Patent: Jan. 5, 2021

(54) FLEXIBLE CONDUIT ELEMENT WITH AN END PORTION SUITABLE FOR ATTACHMENT TO A RIGID CONDUIT ELEMENT, AND METHOD OF ASSEMBLY OF SAME

(71) Applicant: SJM Co. Ltd., Ansan (KR)

(72) Inventors: Jae Kwang Lee, Mannheim (DE); Uwe Webel, Offenbach (DE)

(73) Assignee: SJM Co., Ltd., Ansan (KR)

( * ) Notice: Subject to any disclaimer, the term of this patent is extended or adjusted under 35 U.S.C. 154(b) by 422 days.

(21) Appl. No.: 15/901,652

(22) Filed: Feb. 21, 2018

(65) Prior Publication Data

US 2018/0245502 A1 Aug. 30, 2018

(30) Foreign Application Priority Data

Feb. 28, 2017 (EP) .................................... 17158345

(51) Int. Cl.
| | |
|---|---|
| *F16L 27/11* | (2006.01) |
| *F01N 13/18* | (2010.01) |
| *F16L 27/113* | (2006.01) |
| *F16L 27/111* | (2006.01) |
| *F16L 27/10* | (2006.01) |
| *F16L 51/03* | (2006.01) |
| *F16L 51/02* | (2006.01) |

(52) U.S. Cl.
CPC ...... *F01N 13/1816* (2013.01); *F16L 27/1004* (2013.01); *F16L 27/11* (2013.01); *F16L 27/111* (2013.01); *F16L 27/113* (2013.01); *F01N 2470/12* (2013.01); *F16L 51/026* (2013.01); *F16L 51/027* (2013.01); *F16L 51/029* (2013.01); *F16L 51/03* (2013.01)

(58) Field of Classification Search
CPC ........ F16L 27/107; F16L 27/11; F16L 27/111; F16L 27/108; F16L 27/1085
USPC .......................................................... 285/226
See application file for complete search history.

(56) References Cited

U.S. PATENT DOCUMENTS

| | | | | |
|---|---|---|---|---|
| 5,639,127 | A | * | 6/1997 | Davey ................. F01N 13/1811 |
| | | | | 285/226 |
| 9,631,751 | B2 | * | 4/2017 | Kim ..................... F16L 27/1004 |
| 2003/0102666 | A1 | * | 6/2003 | Huber ................. F01N 13/1816 |
| | | | | 285/288.1 |

(Continued)

FOREIGN PATENT DOCUMENTS

| | | | | |
|---|---|---|---|---|
| CA | 2757966 | A1 * | 5/2012 | ............ F16L 27/111 |
| CA | 2757970 | A1 * | 5/2012 | ............ F01N 13/18 |

(Continued)

OTHER PUBLICATIONS

Office Action dated Apr. 10, 2019, in counterpart EP Application No. 17158345.3-1004.

(Continued)

*Primary Examiner* — David Bochna
(74) *Attorney, Agent, or Firm* — Plumsea Law Group, LLC (57) ABSTRACT

A flexible conduit element with an end portion that is designed for attachment to a rigid conduit element. The flexible conduit includes a bellows member, an interlock member, an outer fixing member and a connection nozzle. An attachment portion of the connection nozzle extends beyond the outer fixing member and the interlock member and ends in a flared shape to form a gas-tight seal.

13 Claims, 5 Drawing Sheets

(56) References Cited

U.S. PATENT DOCUMENTS

| | | | |
|---|---|---|---|
| 2011/0073209 A1* | 3/2011 | Eguchi | F16L 51/027 138/121 |
| 2012/0056414 A1* | 3/2012 | Thomas | F01N 13/148 285/49 |
| 2013/0015652 A1* | 1/2013 | Thomas | F16L 59/21 285/47 |
| 2015/0204470 A1 | 7/2015 | Kim | |
| 2016/0201833 A1* | 7/2016 | Barbely | F01N 13/1816 285/226 |
| 2019/0010856 A1* | 1/2019 | Gade | F16L 27/1004 |

FOREIGN PATENT DOCUMENTS

| | | | | |
|---|---|---|---|---|
| DE | 9422314 U1 * | 12/1999 | | F16L 27/11 |
| DE | 102011086463 A1 * | 5/2013 | | F01N 13/1816 |
| EP | 0989289 A1 | 3/2000 | | |
| EP | 1054140 A1 | 11/2000 | | |
| EP | 2450544 A1 | 5/2012 | | |
| EP | 3002493 A1 * | 4/2016 | | F16L 51/025 |
| EP | 3366897 A1 * | 8/2018 | | F16L 27/113 |
| IE | 29520430 U1 | 2/1996 | | |
| WO | 2014/183773 A1 | 11/2014 | | |
| WO | WO-2014183773 A1 * | 11/2014 | | F16L 55/0337 |

OTHER PUBLICATIONS

Extended European Search Report dated Jun. 21, 2017 for European Patent Application No. 17158345.3.

* cited by examiner

FLEXIBLE CONDUIT ELEMENT WITH AN END PORTION SUITABLE FOR ATTACHMENT TO A RIGID CONDUIT ELEMENT, AND METHOD OF ASSEMBLY OF SAME

BACKGROUND OF THE INVENTION

The present invention relates to a flexible conduit element with an end portion suitable for attachment to a rigid conduit element. In particular, the invention relates to a flexible conduit element suitable for use in an exhaust system. The invention also relates to a method of forming such a flexible conduit element.

Flexible conduit elements for exhaust pipes are used to isolate or dampen general vibration and noise in an exhaust system. Additionally, a flexible conduit element guides exhaust gases from an engine towards an exhaust exit. The flexible conduit element must therefore be gas tight, and also have a gas-tight connection to the adjacent rigid conduit elements of the exhaust system.

Figure 5:
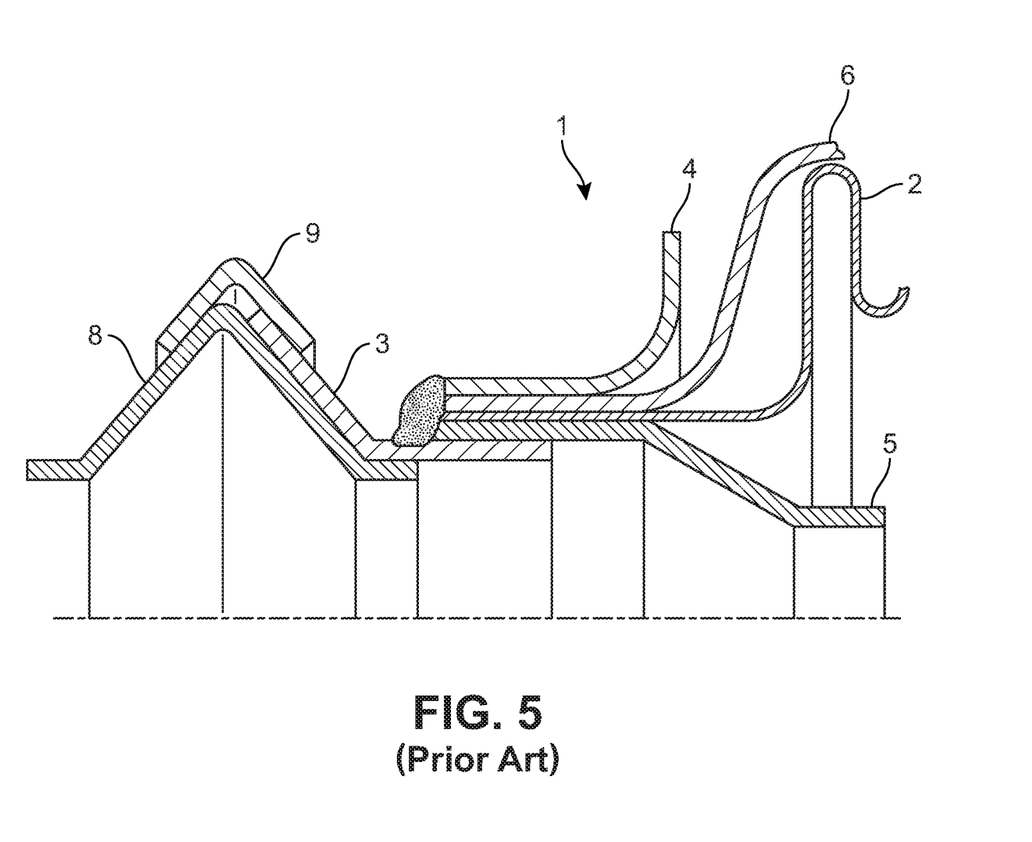
FIG. 5 is a side view cross section of a flexible conduit element at the connection to an adjacent exhaust component, as known from the prior art.

A flexible conduit element and connection for use in exhaust systems is disclosed in EP 3 123 005 A1, and depicted in FIG. 5. According to this prior art, the flexible conduit element 1 comprises a bellows member 2 that provides a gas tight membrane and an outer flexible member 6 that protects the outer surface of the bellows member 2, and also provides a damping function. The connection comprises a outer fixing member 4 that encircles a cylindrical end portion of the flexible conduit element 1, an inner sleeve member 5 that is disposed inside the end portion of the flexible conduit element 1, and a nozzle 3 that is inserted inside the inner sleeve member 5. The inner sleeve member may be attached to a metal hose. The nozzle 3 extends beyond the other members and ends in a flared portion for attachment to an adjacent exhaust system component 8 using a V-clamp 9. A weld is formed at the axial end faces of the outer fixing member 8, flexible member 6, bellows member 2 and inner sleeve member 5, fixing them to the outer circumferential surface of the nozzle 3 and providing a gas tight seal between the bellows member 2 and the nozzle 3.

SUMMARY OF THE INVENTION

It is an object of the present invention to improve economy and performance of such a device.

This object is achieved with a flexible conduit element according to independent claim 1, and a method according to independent claim 10. Preferred embodiments are set out in the dependent claims.

According to an embodiment, there is provided a flexible conduit element configured for use in exhaust systems. The embodiment comprises: a bellows member; an interlock member; an outer fixing member; and an connection nozzle, where, in an axial cross section at an end portion of the flexible conduit element, the outer fixing member is disposed outside of the bellows member, the bellows member is disposed outside of the interlock member, and the interlock member is disposed outside of the connection nozzle, and a gas-tight seal connects the bellows member and the connection nozzle.

By providing the interlock member within the bellows member, smoother airflow can be maintained through the flexible conduit element, reducing back pressure generated in an exhaust system. The interlock member can also serve to increase the damping of vibrations in the flexible conduit element. By disposing the interlock member radially inward from the outer fixing ring, between the bellows member and the connection nozzle in the axial cross section at the end portion of the flexible conduit element, the requirement for an inner sleeve member is obviated. Although the disposing the interlock member at this point introduces a non-gas tight structure between the bellows member and the connection nozzle, this non-gas tight structure is traversed by the gas tight seal, such that the flexible conduit element end portion can be made strong and gas-tight in a simple and economical configuration.

It may be preferable that a tensile hoop stress in the outer fixing member causes an inward radial force. This inward radial force can clamp the bellows member and thus further strengthen and stabilize the connection and ensure its integrity. The inward radial force may be partially balanced by an outward radial force caused by compressive hoop stresses in the connection nozzle, which may have a high stiffness relative to the interlock member and may therefore be able to sustain a high clamping force. It may also be preferable that the inward radial force is at least partially balanced by an outward radial force caused by a compressive hoop stress in the interlock member. This can provide a clamping force that secures the bellows member prior to the connection nozzle being provided, thereby facilitating assembly.

It may also be preferable that an inner circumferential surface of the outer fixing member has an annular groove, and the bellows member has an annular ridge that coincides, in the axial direction, with the annular groove.

This groove and ridge can axially locate the bellows member and outer fixing member relative to one another, without use of a clamping force or weld. This can facilitate assembly prior to insertion of the interlock member and connection nozzle.

It may be preferable that the flexible conduit element further comprises a flexible member, such that the flexible member is disposed between the outer fixing member and the bellows member in the axial cross section.

The flexible member can protect the bellows member and provide damping. Furthermore, by being positioned between the outer fixing member and the bellows member in the cross section, it can be efficiently secured at the end portion of the flexible conduit element along with the bellows member and interlock member.

It may also be preferable that an end portion wall thickness of the interlock member is less than a mid portion wall thickness of the interlock member, and an end portion internal diameter of the interlock member is greater than a mid portion internal diameter of the interlock member.

The thinner end portion wall thickness of the interlock member allows the bellows member to be brought closer to the inner fixing ring, facilitating the formation of a secure gas-tight seal between the bellows member and the connection nozzle. The thicker mid portion wall thickness of the interlock member ensures sufficient flexibility of the interlock member and, accordingly, the flexibility of the flexible conduit element.

The larger end portion internal diameter of the interlock member allows the connection nozzle that is inserted into the interlock member at the end portion of the flexible conduit element to also have a larger internal diameter, thereby suppressing a constriction in the flow path through the flexible conduit element. Better flow through the flexible conduit element may thereby be provided. The smaller mid portion internal diameter of the interlock member allows the interlock member to be made with a greater wall thickness and/or to be disposed further inward from the bellows member, thereby increasing flexibility and/or preventing interference with the bellows member in the mid portion of the conduit element.

It may be preferable that an attachment portion of the connection nozzle extends beyond the outer fixing member, the bellows member, and the interlock member, and ends in a flared conical shape suitable for gas-tight attachment to an exhaust component using a V-clamp or the like.

In this configuration the flexible conduit element can be provided in a form that may be easily and readily attached in a gas-tight manner to adjacent rigid conduit elements. In particular, the attachment can be carried out using mechanical means (i.e., simple tools and a clamping element), without requiring welding.

It may be preferable that the gas tight seal comprises a welded or brazed joint where a weld bead comprising a filler material extends from an axial end face of the outer fixing member, across the axial end faces of the bellows member and interlock member, to an outer circumferential face of the connection nozzle.

By using a weld bead that comprises a filler material in this configuration, a gap between the bellows member and the connection nozzle can be efficiently bridged. A strong and efficient seal may thereby be obtained without having to bring the bellows member and the connection nozzle adjacent to one another. Furthermore, by extending the weld bead from the axial end face of the outer fixing member to the outer circumferential face of the connection nozzle, the weld bead is afforded a strong connection on either side of the bellows member, stabilizing the and strengthening the seal.

It may be preferable that an exposed portion of the interlock member extends beyond the outer fixing member, and the weld bead is formed over the exposed portion.

The exposed portion may thus be more securely welded to the weld bead, thereby improving the strength and integrity of the seal.

It may also preferable that the gas tight seal comprises a welded connection that forms a consolidated portion in the interlock member, the welded connection extending from an inner circumferential face of the outer fixing member to an outer circumferential face of the connection nozzle, via the bellows member and the consolidated portion.

Here, instead of using a weld bead that comprises a filler material to bridge a gap between the bellows member and the connection nozzle, a weld connection penetrates through the interlock member and consolidates it to provide a gas tight welded connection between the inner circumferential face of the outer fixing member to an outer circumferential face of the connection nozzle. A strong, efficient and compact seal may thereby be obtained without having to bring the bellows member and the connection nozzle adjacent to one another.

Another embodiment is a method of forming a flexible conduit element, the method comprising: an assembly step of inserting the connection nozzle so that, in the axial cross section, the outer fixing member is disposed outside of the bellows member, the bellows member is disposed outside of the interlock member, and the interlock member is disposed outside of the connection nozzle, and a sealing step of forming a gas tight seal between the bellows member and the connection nozzle.

With such a method the outer fixing, the bellows member, the interlock member, and the connection nozzle can be efficiently assembled in a simple structure that is robust and gas-tight, whilst suppressing the number of parts and assembly processes.

It may be preferable that the assembly step further comprises: a preliminary assembly step of arranging the outer fixing member, the bellows member and the connection nozzle so that, in the axial cross section, the outer fixing member is disposed outside of the bellows member, and the bellows member is disposed outside of the interlock member, a fixing step, performed after the preliminary assembly step, of fixing the outer fixing member to the bellows member and the connection nozzle, and a subsequent assembly step of inserting the connection nozzle inside the interlock member.

These steps facilitate assembly by avoiding having a large number of unfixed parts to be held in place during the sealing step. The structural connection created during the fixing step can also serve to support and strengthen the gas-tight seal.

It may be preferable that the first fixing step comprises a forming step of applying an outward radial pressure to an inner circumferential face of the interlock member, such that the interlock member is plastically deformed, and then releasing the outward radial pressure so that, after elastic recovery, a compressive hoop stress is created in plastically deformed portions of the interlock member and a tensile hoop stress is retained in the outer fixing member, the compressive hoop stress in the interlock member causing a outward radial force that is at least partially balanced by an inward radial force caused by the tensile hoop stress in the outer fixing member, the bellows member being clamped by the opposing inward radial force and outward radial force.

Such a fixing step can efficiently facilitate assembly by clamping the bellows member between the outer fixing member and the interlock member. It can also serve to reduce the outer portion wall thickness of the interlock member, reducing a gap between the connection nozzle and the bellows member that must be sealed in the sealing step. In particular, the interlock portion can thereby be made more suitable for consolidation as part of a welded connection. It can also serve to increase the outer portion internal diameter of the interlock member, allowing the connection nozzle to have a larger internal diameter and thus avoiding restriction to the flow of gas through flexible conduit element.

It may be preferable that, as part of the sealing step, the outer fixing member is welded to the connection nozzle through the bellows member and the interlock member, using a penetrative welding method such as laser welding, electron beam welding, or the like, such that a consolidated portion is formed in the interlock member and the gas-tight seal extends from an inner circumferential face of the outer fixing member to an outer circumferential face of the connection nozzle, via bellows member and the consolidated portion.

Such a sealing step can efficiently form a gas tight seal between the bellows member and the inner fixer member, the seal being particularly robust and compact.

Alternatively, it may be preferable that, as part of the sealing step, the outer fixing member is welded or brazed to the connection nozzle, using a deposition welding method such as tungsten inert gas welding or the like, or a brazing method, such that a weld bead comprising a filler material is deposited to extend from an axial end face of the outer fixing member, across the axial end faces of the bellows member and the interlock member, to an outer circumferential face of the connection nozzle.

Such a sealing step can efficiently form a gas tight seal between the bellows member and the inner fixer member, the seal being particularly robust and economical. It also allows a seal to be more readily formed in a case where the end portion of the interlock member is not significantly compressed.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
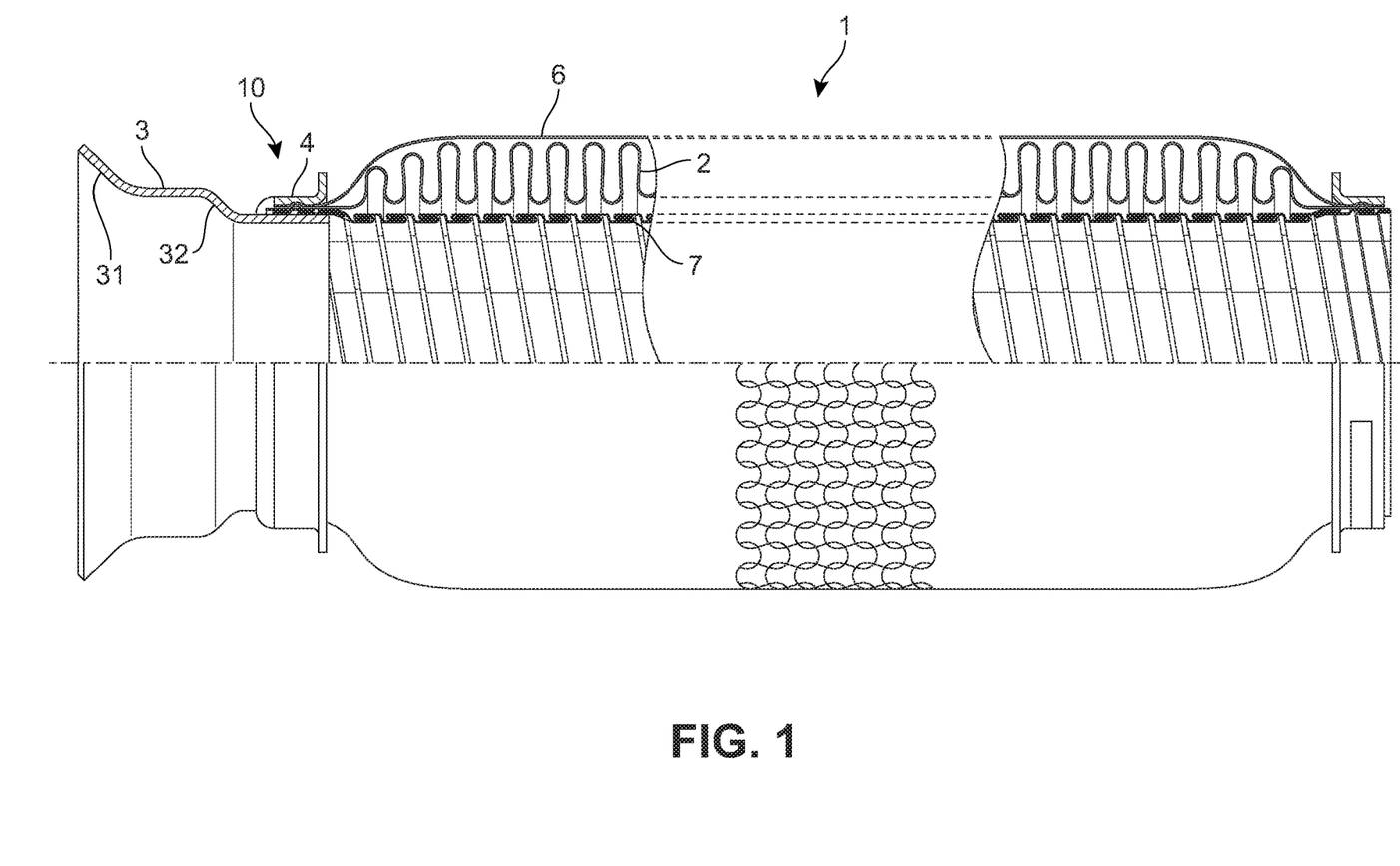
FIG. 1 depicts a flexible conduit element according to a first embodiment of the invention, the upper half showing a side view cross section, and the lower half showing an external view.

FIG. 1 depicts a flexible conduit element 1 according to a first embodiment of the invention, the upper half showing a side view cross section, and the lower half showing an external view.

The flexible conduit element 1 comprises an interlock member 7 arranged within a bellows member 2, and a flexible member 6 arranged concentrically to the outside of the bellows member 2. The interlock member 7 is a non-gas tight, flexible hose made of rigid metal material. The bellows member 2 is a gas-tight metal membrane provided with helical or annular corrugations to enhance flexibility. The flexible member 6 is made from wire that is knitted, woven, braided, or the like.

As can be seen, an end portion 10 of the flexible conduit element 1 comprises a connection nozzle 3 extending to the left, the connection nozzle 3 being a rigid member that facilitates gas-tight connection to adjacent exhaust system components. An end of the connection nozzle 3 is an attachment portion 31 that is flared to fit against a conical portion of the adjacent exhaust system component, such that a gas tight connection can be made by mechanically clamping this attachment portion 31 to the conical portion, for example, by using a V-clamp. Outside the attachment portion 31, connection nozzle 3 also has a section where its diameter is reduced by a short conical section 32, in order to maintain a consistent internal diameter with that of the adjacent exhaust component.

In the end portion 10 of the flexible conduit element 1, another end of the connection nozzle 3 is inserted inside the interlock member 7, the bellows member 2 and the flexible member 6. An outer fixing member 4 is provided around the flexible member 6, such that in an axial cross section at the end portion 10 of the flexible conduit element 1, the outer fixing member 4 is disposed outside an adjacent of the flexible member 6, the flexible member 6 is disposed outside and adjacent of the bellows member 2, the bellows member 2 is disposed outside and adjacent of the interlock member 7, and the interlock member 7 is disposed outside and adjacent of the connection nozzle 3.

Figure 2:
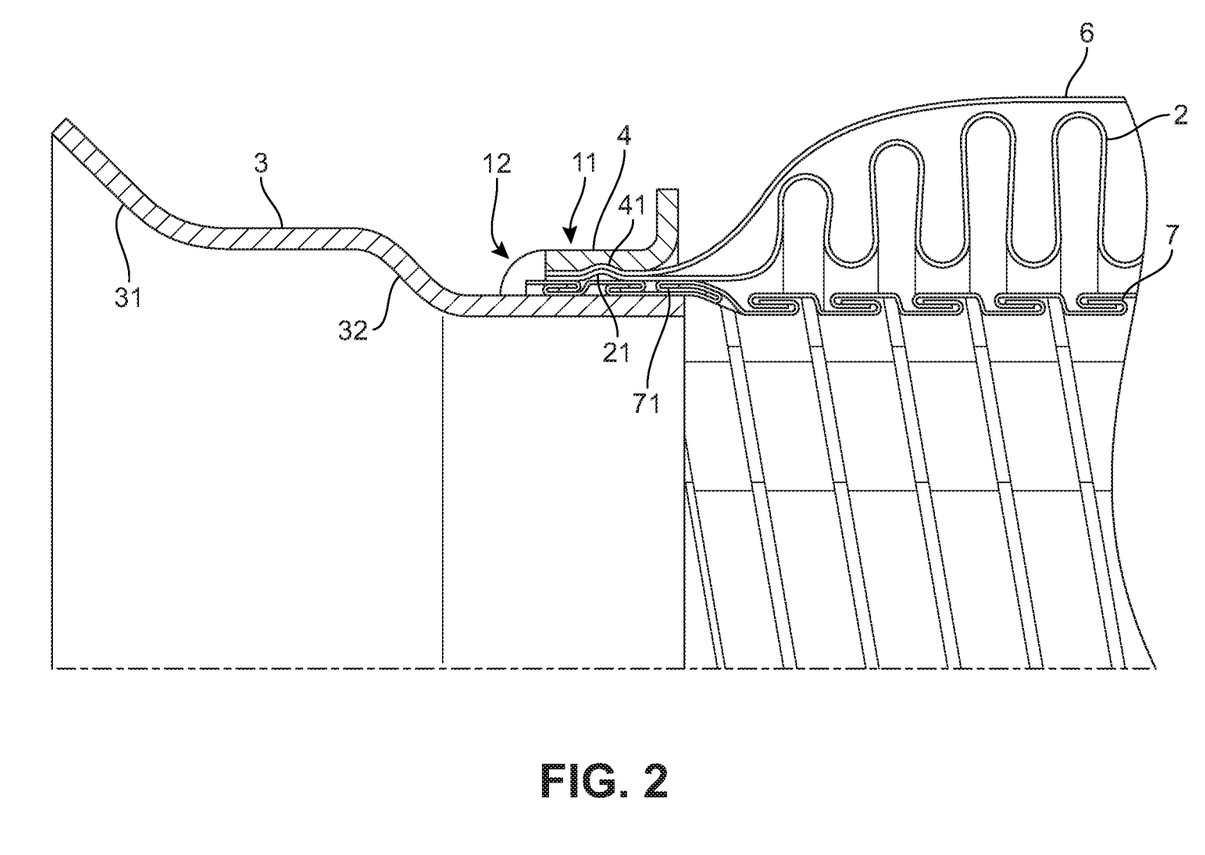
FIG. 2 is a side view cross section of the upper half of an end portion of the flexible conduit element according to the first embodiment of the invention.

FIG. 2 depicts a close up of the connection at the end portion 10. As can be seen an inner circumferential surface of the outer fixing member 4 has an annular groove 41, and the bellows member 2 has an annular ridge 21 that coincides, in the axial direction, with the annular groove 41. The flexible member 6 disposed between the outer fixing member 4 and the bellows member 2 is held in this groove by the ridge on the bellows member 2. The interlock member 7 has a reduced thickness but an increased diameter in the vicinity of the end portion 10. A first gas tight seal is provided by a laser welded connection 11 that penetrates through the concentrically stacked outer fixing member 4, flexible member 6, bellows member 2, interlock member 7 and connection nozzle 3. A second gas tight seal is provided by a TIG welded bead 12 that extends from an axial end face of the outer fixing member 4, across the axial end face of the bellows member 2 and an exposed portion 71 of the interlock member 7, to an outer circumferential face of the connection nozzle 3.

Figure 3:
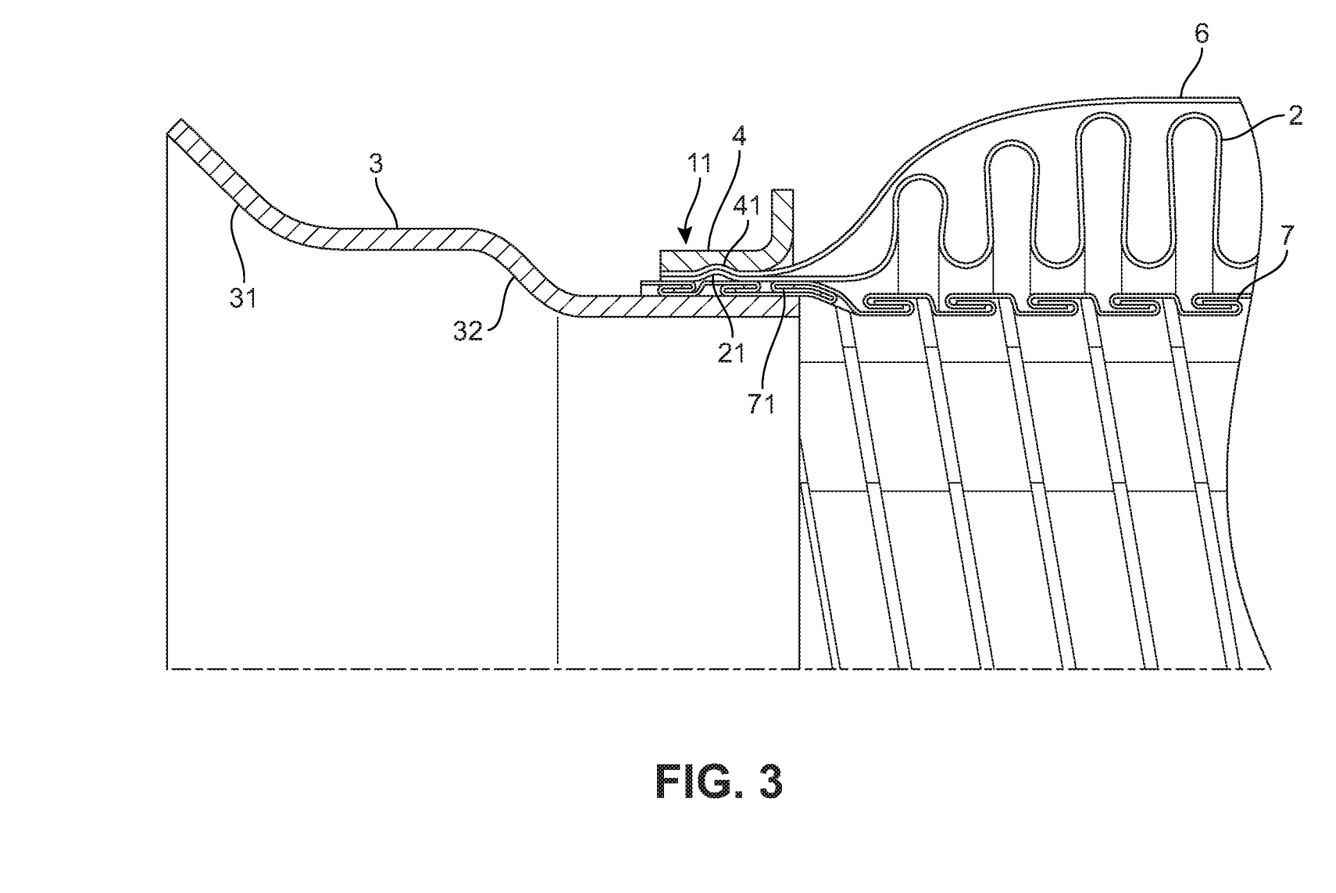
FIG. 3 is a side view cross section of the upper half of an end portion of the flexible conduit element according to a modification of a first embodiment of the invention.

FIG. 3 depicts a modified version of the embodiment where only the first gas tight seal is provided.

Figure 4:
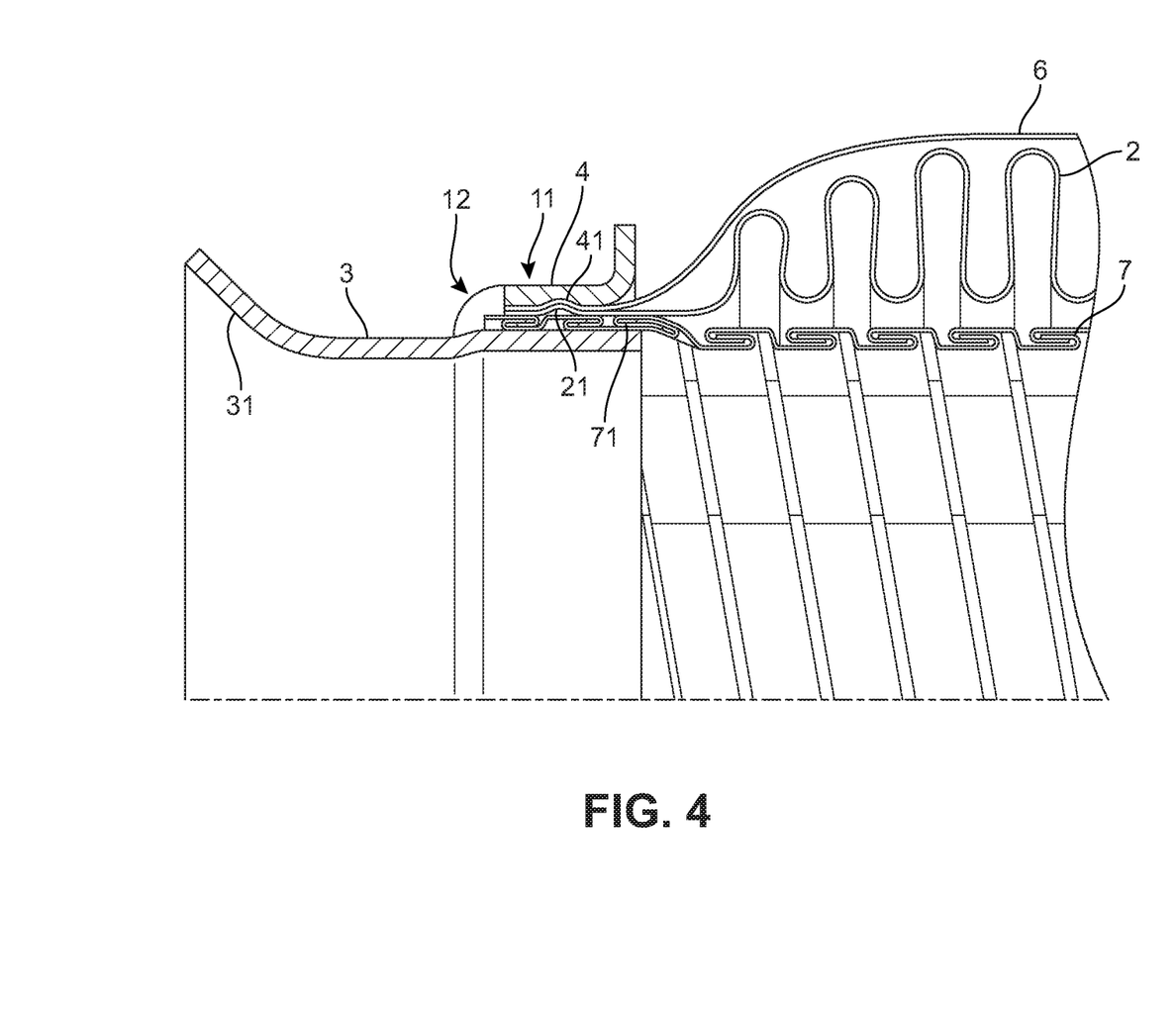
FIG. 4 is a side view cross section of the upper half of an end portion of the flexible conduit element according to a second modification of a first embodiment of the invention.

FIG. 4 depicts second modified version of the embodiment where only the second gas-tight seal is provided, and where the connection nozzle 3 has a section where its diameter is increased between the attachment portion 31 and the connection.

The interlock member 7 extends so that at one point it is arranged concentrically outside the connection nozzle 3 but inside the bellows member 2 and outer fixing member 4. With this arrangement the bellows member 2 and interlock member 7 can be efficiently stabilized and secured together whilst enabling a gas tight seal to be formed between the connection nozzle 3 and the bellows member 2, without requiring an inner sleeve member. It is not essential that the flexible member 6 is also provided or, if it is provided, that the flexible member 6 is also secured by the same structure. For example, the ends of the flexible member 6 may only be loosely secured or retained in a pocket formed by a flange of the outer fixing member 4.

The concentric arrangement of the connection nozzle 3, interlock member 7, bellows member 2 and outer fixing member 4 allows these members to be efficiently stabilized and secured with a simple and efficient structure, but it is not essential that these members are all adjacent. Other members, shims or spacers may be provided between the different members without compromising the structure.

It is also not essential that the interlock member 7 has a reduced thickness and an increased internal and external diameter in the vicinity of the end portion 10. However, the reduced thickness facilitates the forming of the gas-tight seals and enhances the strength and stability of the connection. The increased internal diameter allows the connection member that is inserted into the interlock member 7 to have a larger internal diameter, suppressing a constriction to the airflow through the flexible conduit element 1. However, such a constriction might be tolerable. The increased external diameter also allows the remaining sections of the interlock member 7, having a smaller diameter, to maintain a radial distance from the bellows member 2. However, this radial distance may also be provided by increasing the internal diameter of the corrugated portions of the bellows member 2.

The exposed portion 71 of the interlock member 7 assists in stabilizing and strengthening of the TIG weld bead 12 for the second gas-tight seal, and may preferably extend beyond the axial end face of the outer fixing member 4 by approximately 1 to 1.5 millimetres. However, the exposed portion 71 is not strictly necessary. The bellows member 2 may also extend slightly beyond the outer fixing member 4 to assist in ensuring the TIG weld bead 12 forms a gas tight seal. However, a gas-tight seal may also be obtained by the TIG weld bead 12 even if the axial end face of the bellows member 2 is hidden beneath the outer fixing member 4. In this case the gas tight seal may form without the weld physically contacting the bellows member 2. It may instead be clamped in a gas tight manner against the outer fixing portion, the outer fixing portion then being welded to the connection nozzle 3 by the TIG weld bead 12.

The attachment portion 31 of the connection nozzle 3 is flared for attachment with a V-clamp, but other shapes may be used for different attachment methods. For example, the attachment portion 31 of the connection nozzle 3 may be a flange or a cylindrical section to be welded to the adjacent exhaust gas component. The invention provides an efficient and gas-tight connection between the flexible parts of the flexible conduit element 1 and a connection nozzle 3 of the flexible conduit element 1, the connection nozzle 3 being rigid and therefore more readily attachable to adjacent exhaust gas components regardless of the attachment method.

Prior even to the preliminary assembly step, the bellows member 2 may be fitted into the outer fixing member 4. An inner circumferential surface of the outer fixing member 4 having an annular groove 41, and the bellows member 2 having an annular ridge 21 that coincides, in the axial direction, with the annular groove 41, may facilitate such a fitting process. However, this is not strictly essential. The fitting may also be achieved by a loose press fit, temporary clamping, spot welding, or a similar arrangement.

The clamping in the first fixing step may be attained by applying radial pressure to deform the interlock member 7, the bellows member 2 and the outer fixing member 4, such that the interlock member 7 is at least partially plastically deformed, such that elastic recovery leaves residual stresses that produce the clamping forces. That is to say, radial crushing and circumferential extension of the interlock member 7 creates the compressive hoop stress in the interlock member 7 and tensile stress in the outer fixing member 4 as residual stresses that remain after elastic recovery. The deformation may also involve helical expansion ("uncoiling") of a part of the interlock member 7, if a helical interlock member 7 is used.

This radial pressure can also deform the interlock member 7 to provide the thinner end portion wall thickness and the larger end portion internal diameter, as well as a larger end portion external diameter.

The crushing and expansion of the interlock member 7 may also be carried out without creating significant residual stresses in the interlock member 7 and the outer fixing member 4. That is to say, a loose fit may be created instead of an interference fit. This connection may then be strengthened by the gas-tight seal, alternative fastening methods such as spot welding, or by an interference fit created with the connection nozzle 3.

The clamping forces may also be provided without crushing and/or expansion of the interlock member 7. For example, clamping forces may be obtained by assembling parts at different temperatures such that they interfere with one another when the temperatures equalize. If the interlock member 7 is not crushed, adjacent "coils" of the interlock member 7 may be fixed to one another, or to another member, to increase radial stiffness. The interlock member 7 may also be uncoiled to increase its diameter and push it against the outer fixing member 4 and bellows member 2, and then sport welded or fixed in this "uncoiled" state to retain the outward pressure thus generated. This "uncoiled" state need not extend across the entire length of the interlock member 7.

It may also be preferable that compressive hoop stresses are present in the interlock member 7 prior to insertion of the connection nozzle 3, and that after insertion of the connection nozzle 3, compressive hoop stresses in the connection nozzle 3 cause an outward radial force to act on the interlock member 7 such that the compressive stresses in the interlock member are relieved or even become tensile stresses. In this configuration the bellows member 2 can be clamped between the outer fixing member 4 and the interlock member 7 prior insertion of the connection nozzle 3, thereby facilitating assembly, whilst the entire end portion 10 can be clamped between the outer fixing member 4 and the connection nozzle 3 after complete assembly.

It may also be preferable that, as part of the first fixing step, the outer fixing member 4 is welded to the interlock member 7, through the bellows member 2, in addition to or instead of clamping the bellows member 2 between. Such a fixing step may be provided by for example, spot welding or laser welding, and may also support and strengthen the gas-tight seal subsequently formed in the sealing step.

Although TIG welding is used in the embodiment to form the weld bead 12 of the second gas-tight seal, other deposition welding or brazing techniques may be used.

Although laser welding is used in the embodiment to form the welded connection 11 of the first gas-tight seal, other penetrative welding techniques such as electron beam welding or even spot welding may be used to achieve such a seal.

Although in the embodiment two gas-tight seals are provided, a TIG welded bead 12 and a laser welded connection 11, only one of these may be required. Furthermore, the other connection means may be additionally provided for strength and stability, even if it does not also form a gas-tight seal.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A flexible conduit element (1) configured for use in exhaust systems, comprising:
   a bellows member (2);
   an interlock member (7);
   an outer fixing member (4); and
   an connection nozzle (3), wherein
   in an axial cross section at an end portion (10) of the flexible conduit element (1), the outer fixing member (4) is disposed outside of the bellows member (2), the bellows member (2) is disposed outside of the interlock member (7), and the interlock member (7) is disposed outside of the connection nozzle (3),
   an attachment portion (31) of the connection nozzle (3) extends beyond the outer fixing member (4), the bellows member (2) and the interlock member (7), and ends in a flared shape suitable for gas-tight attachment to an exhaust component using a V-clamp or the like, and a gas-tight seal connects the bellows member (2) and the connection nozzle (3).

2. A flexible conduit element (1) according to claim 1, wherein a tensile hoop stress in the outer fixing member (4) causes an inward radial force, and the inward radial force is at least partially balanced by an outward radial force caused by a compressive hoop stress in the interlock member (7) and/or the connection nozzle (3).

3. A flexible conduit element (1) according to claim 1, wherein an inner circumferential surface of the outer fixing member (4) has an annular groove (41), and the bellows member (2) has an annular ridge (21) that coincides, in the axial direction, with the annular groove (41).

4. A flexible conduit element (1) according to claim 1, further comprising a flexible member (6), and wherein the flexible member (6) is disposed between the outer fixing member (4) and the bellows member (2) in the axial cross section.

5. A flexible conduit element (1) according to claim 1, wherein an end portion wall thickness of the interlock member (7) is less than a mid portion wall thickness of the interlock member (7), and an end portion internal diameter of the interlock member (7) is greater than a mid portion internal diameter of the interlock member (7).

6. A flexible conduit element (1) according to claim 1, wherein the gas tight seal comprises a welded or brazed joint where a weld bead (12) comprising a filler material extends from an axial end face of the outer fixing member (4), across the axial end faces of the bellows member (2) and interlock member (7), to an outer circumferential face of the connection nozzle (3).

7. A flexible conduit element (1) according to claim 1, wherein the gas tight seal comprises a welded connection (11) that forms a consolidated portion in the interlock member (7), the welded connection extending from an inner circumferential face of the outer fixing member (4) to an outer circumferential face of the connection nozzle (3), via the bellows member (2) and the consolidated portion.

8. A method of forming a flexible conduit element (1) according to claim 1, the method comprising:

an assembly step of arranging the outer fixing member (4), the bellows member (2), the interlock member (7) and the connection nozzle (3) so that, in the axial cross section, the outer fixing member (4) is disposed outside of the bellows member (2), the bellows member (2) is disposed outside of the interlock member (7), and the interlock member (7) is disposed outside of the connection nozzle (3), and a sealing step of forming a gas tight seal between the bellows member (2) and the connection nozzle (3).

9. A method according to claim 8, wherein the assembly step further comprises:

a preliminary assembly step of arranging the outer fixing member (4), the bellows member (2) and the connection nozzle (3) so that, in the axial cross section, the outer fixing member (4) is disposed outside of the bellows member (2), and the bellows member (2) is disposed outside of the interlock member (7), a fixing step, performed after the preliminary assembly step, of fixing the outer fixing member (4) to the bellows member (2) and the connection nozzle (3), and a subsequent assembly step of inserting the connection nozzle (3) inside the interlock member (7).

10. A method according to claim 9, wherein the fixing step comprises a forming step of applying an outward radial pressure to an inner circumferential face of the interlock member (7), such that the interlock member (7) is at least partially plastically deformed, and then releasing the outward radial pressure so that, after elastic recovery, a compressive hoop stress is created in plastically deformed portions of the interlock member (7) and a tensile hoop stress is retained in the outer fixing member (4), the compressive hoop stress in the interlock member (7) causing a outward radial force that is at least partially balanced by an inward radial force caused by the tensile hoop stress in the outer fixing member (4), the bellows member (2) being clamped by the opposing inward radial force and outward radial force.

11. A method according to claim 8, wherein, as part of the sealing step, the outer fixing member (4) is welded to the connection nozzle (3) through the bellows member (2) and the interlock member (7), using a penetrative welding method such as laser welding, electron beam welding, or the like, such that a consolidated portion is formed in the interlock member (7) and the gas-tight seal is formed as a welded connection (11) that extends from an inner circumferential face of the outer fixing member (4) to an outer circumferential face of the connection nozzle (3), via bellows member (2) and the consolidated portion.

12. A method according to claim 8, wherein, as part of the sealing step, the outer fixing member (4) is welded or brazed to the connection nozzle (3), using a deposition welding method such as tungsten inert gas welding or the like, or a brazing method, such that a weld bead (12) comprising a filler material is deposited to extend from an axial end face of the outer fixing member (4), across the axial end faces of the bellows member (2) and the interlock member (7), to an outer circumferential face of the connection nozzle (3).

13. A flexible conduit element (1) configured for use in exhaust systems, comprising:

a bellows member (2);
an interlock member (7);
an outer fixing member (4); and
an connection nozzle (3), wherein
in an axial cross section at an end portion (10) of the flexible conduit element (1), the outer fixing member (4) is disposed outside of the bellows member (2), the bellows member (2) is disposed outside of the interlock member (7), and the interlock member (7) is disposed outside of the connection nozzle (3), a gas-tight seal connects the bellows member (2) and the connection nozzle (3), the gas tight seal comprises a welded or brazed joint where a weld bead (12) comprising a filler material extends from an axial end face of the outer fixing member (4), across the axial end faces of the bellows member (2) and interlock member (7), to an outer circumferential face of the connection nozzle (3), and an exposed portion (71) of the interlock member (7) extends beyond the outer fixing member (4), and the weld bead (12) is welded over the exposed portion (71).

* * * * *